United States Patent [19]

Takahashi et al.

[11] 3,878,139

[45] Apr. 15, 1975

[54] ACRYLATE AND STYRENE GRAFT COPOLYMERS OF MERCAPTO-GROUP-CONTAINING CELLULOSE DERIVATIVES AND COATING COMPOSITION CONTAINING SAME

[75] Inventors: Mitsura Takahashi, Osaka; Uraji Narushima, Yokohama; Yukio Omori, Kobe, all of Japan

[73] Assignee: Nippon Paint Co., Ltd., Osaka, Japan

[22] Filed: Jan. 26, 1973

[21] Appl. No.: 326,694

[30] Foreign Application Priority Data
Jan. 31, 1972 Japan.................................. 47-11239

[52] U.S. Cl............................... 260/17 A; 260/216
[51] Int. Cl............................................. C08b 15/00
[58] Field of Search.................. 260/215, 214, 17 A

[56] References Cited
UNITED STATES PATENTS

| | | | |
|---|---|---|---|
| 3,357,933 | 12/1967 | Wing Lee | 260/17 A |
| 3,445,556 | 5/1969 | Kuzmak et al. | 260/17 A |
| 3,492,082 | 1/1970 | Faessinger & Conte | 260/17 A |
| 3,669,916 | 6/1972 | Nakao et al. | 260/17 A |
| 3,738,924 | 6/1973 | Dotson et al. | 260/17 A |

FOREIGN PATENTS OR APPLICATIONS

| | | | |
|---|---|---|---|
| 38-1249 | 2/1963 | Japan | 260/17 A |
| 886,552 | 1/1962 | United Kingdom | 260/17 A |

OTHER PUBLICATIONS

Chemical Abstracts, Vol. 73, Entry 131897c, 1970, T. Rainer.

*Primary Examiner*—Howard E. Schain
*Assistant Examiner*—Peter F. Kulkosky
*Attorney, Agent, or Firm*—Wenderoth, Lind & Ponack

[57] ABSTRACT

A coating composition which comprises as an essential component a resin prepared by reacting a mercapto group-containing cellulose derivative with one or more polymerizable monomers, the said mercapto group-containing cellulose derivative being obtained by the reaction between a cellulose derivative being soluble in water or an organic solvent or melted without any decomposition and a mercaptocarboxylic acid. The coating composition is excellent in workability on coating and can afford a uniform coating film having a good appearance and favorable mechanical properties with a high resistance to chemical reagents.

23 Claims, No Drawings

ACRYLATE AND STYRENE GRAFT COPOLYMERS OF MERCAPTO-GROUP-CONTAINING CELLULOSE DERIVATIVES AND COATING COMPOSITION CONTAINING SAME

The present invention relates to a resin and a coating composition containing the same. More particularly, it relates to a resin obtained by reacting a mercapto group-containing cellulose derivative with one or more polymerizable monomers and a coating composition comprising the resin as an essential component.

In fiber industry, there has heretofore been practised the graft polymerization of polymerizable monomers onto cellulose derivatives, mainly for the purpose of improving the properties of fibers prepared with them. In other fields (e.g. paint industry), however, such grafting has not been attempted to practically apply. In fact, a conventional grafting procedure can afford only polymers of low grafting rate, which are not sufficiently uniform and transparent to be used as resins for painting compositions.

On the other hand, cellulose derivatives themselves are usually employed on admixture with other resins in paint industry. Since, however, their compatibility is not sufficient, the kind and blending ratio of the resins are considerably restricted. Thus, the characteristic properties of cellulose derivatives and/or resins blended therewith can be not fully utilized. For instance, an acrylic resin can afford a coating film, which is excellent in drying property, water resistance, alkali resistance, acid resistance, contamination resistance and weathering durability, but the hardness, strength and solvent resistance of the film formed thereby are insufficient. For overcoming such drawbacks, a cellulose derivative is blended into the acrylic resin to obtain a coating film imparted thereto advantageous properties originating from the cellulose derivative. Due to their insufficient compatibility, however, the blending ratio is considerably restricted, and the resulting coating film is unsatisfactory in appearance, gloss, thickness and the like.

As the result of the extensive study, it has now been found that cellulose derivatives introduced a mercapto group(s) therein can be readily reacted with polymerizable monomers to give polymers of high grafting rate, which are sufficiently uniform and transparent to be used as resins for painting compositions. It has also been found that the thus produced polymers, i.e. grafted cellulose derivatives, show an excellent compatibility with various resins such as acrylic resins. It has further been found that the resulting blend composition of the polymers with other resins are provided with a variety of advantageous properties suitable for coating compositions. This invention is based on these findings.

Accordingly, a basis object of the present invention is to embody a uniform and transparent resin suitable for painting compositions. Another object of this invention is to embody a cellulose derivative which is compatible with various resins. A further object of the invention is to embody a cellulose derivative grafted with polymerizable monomers thereon at a high grafting rate. A further object of the invention is to embody a process for grafting polymerizable monomers on a cellulose derivative. A still further object of the invention is to embody a coating composition containing as an essential component a cellulose derivative grafted with polymerizable monomers thereon. These and other objects will be apparent to those conversant with the art to which the present invention pertains from the foregoing and subsequent descriptions.

The coating composition of the invention comprises as the essential component a resin obtained by the reaction of a mercapto group-containing cellulose derivative and one or more polymerizable monomers.

The starting mercapto group-containing cellulose derivative can be produced by the reaction of a cellulose derivative with a mercaptocarboxylic acid as fundamentally shown by the following formulae:

(Cellulose derivative)-OH + HOOC-A-SH
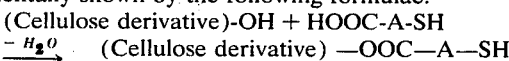
(Cellulose derivative) —OOC—A—SH wherein A is the residue of a mercaptocarboxylic acid excluding —COOH and —SH therefrom. Practically, the reaction is effected between a cellulose derivative having a free hydroxyl group or a reactive group derived therefrom such as esterified hydroxyl (e.g. lower alkanoyloxy) and a mercaptocarboxylic acid or its reactive derivative on the carboxyl group such as acid anhydride in the presence or absence of an inert solvent, usually at a temperature from room temperature (e.g. 10°C) to 250°C, if necessary, in the coexistence of an acid (e.g. sulfuric acid, sulfoacetic acid), an acid anhydride (e.g. acetic anhydride, butyric anhydride), a base (e.g. pyridine, sodium hydroxide), a salt (e.g. potassium acetate, zinc chloride) or any other catalytic substance.

As the cellulose derivative, there may be employed nitrocellulose, cellulose acetate, cellulose acetate propionate, cellulose acetate butyrate, methylcellulose, ethylcellulose, benzylcellulose, hydroxyalkylcellulose, carboxymethylcellulose or the like. The cellulose derivative is required to be melted without decomposition or dissolved in water or any ordinary organic solvent such as a hydrocarbon, a nitrohydrocarbon, a chlorohydrocarbon, an alcohol, an ether, an ester, a ketone, an amide, a sulfoxide or their mixture. When the cellulose derivative is not melted or dissolved, the reaction with the mercaptocarboxylic acid does not proceed uniformly, and the resin as ultimately produced is neither uniform nor transparent and show a poor compatibility with other resins. Among the above exemplified cellulose derivatives, the most preferable is cellulose acetate butyrate, because the resin produced therewith is excellent in gloss, color and gloss retention, weathering durability, heat resistance and thermal fluidity. Particularly, the one having a viscosity of 0.1 to 6 seconds is suitable for the production of a painting composition which possesses a good workability on coating (the viscosity being determined according to ASTM D-817-65 (Formula A)).

As the mercaptocarboxylic acid, there may be usually employed the one having at least one mercapto group and one or two carboxyl groups. Specific examples of such mercaptocarboxylic acid are as follows: thioglycollic acid, mercaptopropionic acid, thiomalic acid, thiosalicylic acid, etc.

In order to provide the resin with a satisfactory uniformity and a sufficient transparency, the content of the mercapto groups in the mercapto group-containing cellulose derivative is required to be from $1 \times 10^{-4}$ to $1 \times 10^{-2}$ g.equivalent/g, preferably from $5 \times 10^{-4}$ to $5 \times 10^{-3}$ g.equivalent/g. In case of the mercapto group content being less than the said lower limit, the resulting resin will lose uniformity and transparency. In case of the mercapto group content being more than the said upper limit, polymers of low molecular weights may be produced and the coating film produced thereby will have inferior properties. Because of these reasons, the ratio of the cellulose derivative and the mercaptocarboxylic acid to be reacted and the reaction conditions between them may be appropriately controlled so as to realize the said mercapto group content in the resulting mercapto group-containing cellulose derivative.

The reaction of the thus prepared mercapto group-containing cellulose derivative with one or more polymerizable monomers may be carried out in a conventional procedure usually adopted for polymerization. Usually, 1 to 95 parts by weight (favorably 3 to 60 parts by weight) of the mercapto group-containing cellulose derivative are reacted with 99 to 5 parts by weight (preferably 97 to 40 parts by weight) of the polymerizable monomer(s) at a temperature from 40° to 160°C in the presence of a polymerization initiator such as an azo compound (e.g. azobisisobutyronitrile, azobismethylvaleronitrile) or a peroxide (e.g. lauroyl peroxide, stearoyl peroxide, benzoyl peroxide, di-t-butyl peroxide, di-t-cumyl peroxide, tbutyl peroxyisobutyrate, methyl ethyl ketone peroxide), if necessary, in the coexistence of a chain transfer agent such as a mercaptan (e.g. lauroyl mercaptan, dodecyl mercaptan), disulfide (e.g. diisopropylxanthogen di-sulfide) or a halogen compound. The reaction is ordinarily completed within a period of 2 to 15 hours.

As the polymerizable monomer(s), there may be exemplified esters of acrylic acid and methacrylic acid with alkanols having an alkyl group of 1 to 15 carbon atoms (e.g. ethyl acrylate, n-butyl acrylate, isobutyl acrylate, t-butyl acrylate, 2-ethylhexyl acrylate, dodecyl acrylate, methyl methacrylate, ethyl methacrylate, n-butyl methacrylate, isobutyl methacrylate, t-butyl methacrylate, 2-ethylhexyl methacrylate, lauryl methacrylate), styrene and its derivatives (e.g. styrene, α-methylstyrene, vinyltoluene, p-t-butylstyrene), hydroxyl compounds having one or more hydroxyl groups (e.g. 2-hydroxyethyl acrylate, 2-hydroxypropyl acrylate, 1-methyl-2-hydroxyethyl acrylate, 2-hydroxyethyl methacrylate, 1-methyl-2-hydroxyethyl methacrylate, polypropylene glycol monomethacrylate, glycerol monomethacrylate), glycidyl acrylate and glycidyl methacrylate, acrylonitrile and methacrylonitrile and carboxylic compounds having one or more carboxyl groups (e.g acrylic acid, methacrylic acid, crotonic acid, itaconic acid, fumaric acid, maleic acid).

The polymerizable monomer(s), may be subjected to the reaction all at once or in portions in several times. In other words, the reaction may be carried out in a single stage or multi stages. The kind of the polymerizable monomer is not necessarily required to be one, and two or more kinds of the polymerizable monomers may be used in the same or different stage(s).

The reaction between the mercapto group-containing cellulose derivative and the polymerizable monomer(s) proceeds first to produce a graft polymer and, by the emulsifying effect of this graft polymer, the polymers as subsequently produced can be maintained in a homogeneous state. In order to attain a high grafting rate at the initial stage of the reaction, the use of a peroxide as the polymerization initiator and of a polymerizable monomer which is readily subjected to the chain transfer to the mercapto group are favorable. In the subsequent stage of the reaction, an azo compound which is not so readily subjected to the chain transfer may be used as the polymerization initiator, but a peroxide can be also used advantageously. When the polymerizable monomer(s) are subjected to the reaction in portions, it is the most economical and practical to divide them into two portions.

The reaction may be performed in any conventional mode of polymerization, i.e. solution polymerization, suspension polymerization, bulk polymerization or emulsion polymerization. In most cases, the adoption of solution polymerization or suspension polymerization is preferred. The solution polymerization is carried out in a solvent or a mixture of solvents, and the resultant solution may be as such employed as a coating composition, or after elimination of the solvent, the residual product is used as a resin.

In case of the suspension polymerization, for instance, an aqueous solution of a suspension stabilizer (e.g. a natural high molecular compound or its derivative, a water soluble synthetic high molecular compound, a hardly soluble salt, an inorganic high molecular compound, a metal or a metal oxide in powder form) and a small amount of an aqueous buffer solution of a promoter for stabilization (e.g. a phosphate, a surface active agent) are added to a solution containing the polymerizable monomer, the polymerization initiator and the chain transfer agent, and the mixture is rapidly stirred whereby fine granules of 0.01 to 2 mm in diameter are formed. The mixture is heated at about 40° to 90°C for 2 to 7 hours with stirring to complete the reaction. The granular product is collected by filtration and dried.

When the amount of the mercapto group-containing cellulose derivative is less than 1 percent by weight on the combined weight of the same and the polymerizable monomer(s), the obtained product possesses substantially the same properties as the polymer of the polymerizable monomer(s), the properties of the cellulose derivative being not reflected thereupon. When the amount of the mercapto group-containing cellulose derivative is more than 95 % by weight, the properties of the polymer of the polymerizable monomer can not be reflected, and there is obtained a product having substantially the same properties as the cellulose derivative. Further, unreacted mercapto groups may have an undesirable influence upon the stability on storage and the weathering durability of the coating film to be formed. The preferred weight ratio of the mercapto groupcontaining cellulose derivative and the polymerizable monomer(s) to be used may be thus from 3 : 97 to 60 : 40.

The esters of acrylic acid and methacrylic acid with alcohols having an alkyl group of 1 to 15 carbon atoms may be, if used, usually in an amount of 30 to 100 % by weight on the basis of the total weight of the polymerizable monomer(s). Among the esters exemplified above, practically preferred are ethyl acrylate, n-butyl acrylate, isobutyl acrylate, t-butyl acrylate, 2-ethylhexyl acrylate, methyl methacrylate, ethyl methacrylate, n-butyl methacrylate, isobutyl methacrylate, t-butyl methacrylate, 2-ethylhexyl methacrylate, lauryl methacrylate, etc. The use of such polymerizable monomers can provide the coating film with good transparency, weathering durability, resistance to chemical reagents and the like.

The styrene and its derivatives may be used in an amount of 50 % by weight or less on the basis of the total weight of the polymerizable monomer(s). They are advantageous in good polymerizability with other monomers and can impart an excellent gloss to the coating film to be formed. When, however, the amount exceeds 50 % by weight, an unfavorable influence will be exerted upon the weathering durability of the film. Practically preferred are styrene, vinyltoluene, p-t-butylstyrene, α-methylstyrene, etc.

The hydroxyl compounds having one or more hydroxyl groups may be used in an amount of 25 % by weight or less on the basis of the total weight of the polymerizable monomer(s). By its addition, there is obtained the resin of good uniformity. It produces a good effect to the gloss and solvent resistance of the film. The use may be necessitated, especially in case that a cross-linking agent such as an aminoplast resin, a polyisocyanate compound or a blocked isocyanate compound is added to the composition. When the amount is larger than 25 % by weight, the water resistance of the film becomes lowered. Practically preferred are 2-hydroxyethyl acrylate, 2-hydroxypropyl acrylate, 2-hydroxyethyl methcarylate, 2-hydroxypropyl methacrylate, polypropylene glycol monomethacrylate, etc.

The amount of glycidyl acrylate and glycidyl methacrylate may be 5 to 40 % by weight on the basis of the total weight of the polymerizable monomer(s). When it is less than 5 % by weight, the degree of cross linkage becomes small so that the physical properties of the film (e.g. strength, solvent resistance, chemical resistance) are deteriorated. When it exceeds 40 % by weight, the degree of cross linkage becomes so large that the film becomes fragile, or unreacted epoxy groups exert a bad influence upon the weathering durability. By the simultaneous use of these glycidyl compounds with an organic compound having two or more carboxyl groups, a thermosetting coating composition can be obtained.

The amount of acrylonitrile and methacrylonitrile may be 10 % by weight or less on the basis of the total weight of the polymerizable monomer(s). They exert an excellent chain transfer effect to the cellulose derivative so that the resulting resin shows a good uniformity. But, when the amount is larger than 10 % by weight, the resultant resin is colored, or the film becomes yellowish at baking.

The carboxylic compounds having one or more carboxyl groups may be used in an amount of 5 % by weight or less on the basis of the total weight of the polymerizable monomer(s). On dispersing a filler such as a pigment into the resin or the solution of the resin, the presence of carboxyl groups in the resin is effective in maintaining a good dispersion state. Further, in case of adding a cross-linking agent, these carboxylic compounds promote the curing speed of the film. When the amount exceeds 5 % by weight, the film becomes insufficient in gloss, weathering durability and water resistance and, in case of adding a cross-linking agent, the stability of the resin on storage is lowered. Practically preferred are acrylic acid, methacrylic acid and itaconic acid.

When the mercapto group-containing cellulose derivative is treated with the polymerizable monomer(s) as above, a chain transfer reaction caused by the mercapto groups in the said cellulose derivative takes place to give a product wherein the said polymerizable monomer(s) are grafted on the said cellulose derivative. The grafting is accomplished with little gel formation and a high grafting rate is attained, unlike the case of the graft reaction of a conventional cellulose derivative containing a polymerizable unsaturated group with a polymerizable monomer.

The resulting product from the reaction between the mercapto group-containing cellulose derivative and the polymerizable monomer(s) may be thus considered to be a mixture comprising the cellulose derivative, the polymer of the polymerizable monomer(s) and the graft polymer of the cellulose derivative with the polymerizable monomer(s).

The thus obtained resin possesses a good miscibility with other resins and additives such as acrylic resins, alkyd resins, ester gums, maleic acid resins, phenol resins, epoxy resins, aminoplast resins, polyisocyanate compounds, blocked polyisocyanate compounds, organic compounds having two or more carboxyl groups and the like. By incorporating these resins, the resultant composition can afford a coating film more excellent in various properties such as appearance, gloss, thickness, processability, water-resistance, alkali resistance, acid resistance, solvent resistance, contamination resistance, weathering durability and strength with good workability on coating.

The incorporation of a cellulose derivative may be attempted in some cases. In general, the same cellulose derivative as used in the said reaction is preferred, but any other cellulose derivative having a good miscibility may be also employed. Among various cellulose derivatives, the most preferred is cellulose acetate butyrate which is excellent in gloss, color and gloss retention, weathering durability, heat stability and thermal fluidity. Particularly, the one having a viscosity of 0.1 to 6 seconds is suitable for preparing a composition for paints, assuring a good workability on coating. The amount of the cellulose derivative to be added may be equal to or less than the weight of the resin.

The addition of an alkyd resin is effective in improving the workability on coating, the thickness and the anti-cracking property at a low temperature. The amount to be added is favorably 200 parts by weight or less to 100 parts by weight of the resin. When it exceeds the upper limit, the film becomes insufficient in hardness, drying, solvent resistance and the like.

When desired, acrylic resins may be incorporated into the resin so as to obtain a composition utilizable for various purposes. The favorable amount to be incorporated is 150 parts by weight or less to 100 parts by weight of the resin.

By the incorporation of a cross-linking agent such as an aminoplast resin, a polyisocyanate compound, a blocked polyisocyanate compound or an organic compound having two or more carboxyl groups, the film can be more improved in appearance, gloss and other physical and chemical properties.

The aminoplast resin mentioned above is the substance obtained by the additive condensation of urea, melamine or guanamines with aldehydes (e.g. formaldehyde) or the etherification of the resulting product with alcohols. It may be used in an amount of 5 to 40 parts by weight to 100 parts by weight of the resin. When the aminoplast resin is used, the drying of the coating film is preferably carried out at about 80° to 200°C.

The polyisocyanate compound includes a polyisocyanate adduct obtained by the addition of a diisocyanate (e.g. hexamethylenediisocyanate, tolylenediisocyanate) to a polyol of low molecular weight, a polyisocyanate having a biuret structure and a polyisocyanate having an allophanate structure. The amount to be used may be 5 to 50 parts by weight to 100 parts by weight of the resin. The coating film is favorably dried at a temperature from room temperature to about 80°C.

The blocked polyisocyanate compound is the addition product of a diisocyanate or a polyisocyanate compound as mentioned above and a blocking agent (e.g. phenols, alcohols, lactams, active methylene compounds, amines, oximes). The amount to be used may be 5 to 60 parts by weight to 100 parts by weight of the resin. In case of the incorporation of the blocked polyisocyanate compound, it is preferred to employ a dissociation catalyst such as a base (e.g. triethylamine, Nmethylmorpholine) or a metal compound (e.g. dibutyltin dilaurate, stannous chloride). The coating film is favorably dried at about 120° to 220°C.

Examples of the organic compound having two or more carboxyl groups are polycarboxylic acids of low molecular weight (e.g. adipic acid, sebacic acid, phthalic acid, trimellitic acid), polyester resins obtained by condensation of polyols with excessive polycarboxylic acids, etc. The amount to be used may be 3 to 50 parts by weight to 100 parts by weight of the resin. It is preferred to adjust the equivalent ratio of epoxy groups and carboxyl groups to 0.8 to 1.2. The formed coating film may be usually dried at about 120° to 220°C.

As stated above, the resin obtained by the present invention shows a good miscibility with many kinds of resins and, by their admixture, can acquire various excellent properties. Thus, it can be utilized for a variety of purposes and is especially suitable for paints.

On the practical use, the coating composition of the present invention may be employed as solution or powder. In case of using as solution, the amount of the solvent may be usually from 40 to 80 % by weight on the basis of the total weight of the solution. As the solvent, the one having a solubilizing property somewhat higher than that of ordinary solvents employed for acrylic resins is favorably employed. Examples of such solvents are an aromatic hydrocarbon (e.g. toluene, xylene), a ketone (e.g. acetone, methyl ethyl ketone, methyl isobutyl ketone), an ester (e.g. butyl acetate, ethylene glycol acetate monoethyl ether) and an ether alcohol (e.g. ethylene glycol monoethyl ether, ethylene glycol monobutyl ether). There may be also employed an aliphatic hydrocarbon (e.g. heptane, octane) or an alcohol (e.g. ethyl alcohol, butyl alcohol), but preferably in a small amount.

When used in powder form, the coating composition is required to be melted at 50°C or higher for maintaining the powdery state at room temperature but not higher than 200°C for being melted to form a coating film. In order to maintain an appropriate thermal fluidity and desirable properties of the film, the molecular weight of the polymer component of the polymerizable monomer is preferred to be in a range of about 1,000 to 100,000. For the determination of the molecular weight, the polymer component can be isolated from the graft polymer by breaking the ester linkage between the cellulose derivative moiety and the mercaptocarboxylic acid moiety by a conventional hydrolysis procedure.

The coating composition of the invention may be colored with a pigment usually employed for coloring of organic coating compositions, such as an organic pigment (e.g. phthalocyanine blue or green) or an inorganic pigment (e.g. carbon black, titanium dioxide, aluminum flake).

The coating composition of the invention may be also incorporated with other additives such as a wetting agent, a conditioning agent for the surface of the film, a promoter for hardening and an antioxidizing agent.

The application of the coating composition of the invention may be executed by a conventional method. That is, when employed as a solution, the composition is applied by brushing, roller coating, spraying with compressed air or with a petroleum solvent of low melting point, and when as powders, it is applied by electrostatical coating or fluidized bed coating.

The coating composition of the invention may be applied to a variety of materials such as wood, glass, metal, stone, plastics and cloth. The composition obtained by the use of cellulose acetate butyrate having a viscosity of 0.1 to 6 seconds is particularly suitable as paints for the topcoat for automobiles.

Practical and presently preferred embodiments of the present invention are illustratively shown in the following Examples wherein parts and percentages are by weight.

EXAMPLE 1

In a reaction vessel equipped with a stirrer, a thermometer, a cooler and a gas inlet, there are charged cellulose acetate butyrate (trade name "EAB-451-1" manufactured by Eastman Chemical Products Inc.; viscosity, 1 second) (57.5 parts), thioglycollic acid (6.9 parts) and acetyl ethylene glycol monoethyl ether (24.5 parts), and stirring is continued at 150° to 155°C for 6 hours while introducing nitrogen gas therein. After completion of the reaction, the mixture is admixed with butyl acetate (74.6 parts) to give a solution of the cellulose derivative containing mercapto groups in an amount of $5.3 \times 10^{-4}$ g.equivalent/g (determined by iodometry). The mercapto group-containing cellulose derivative solution contains 30.7 % of involatile components and possesses a viscosity of $Z_7$, an acid value of 9.2 and a color number of 1.

In a reaction vessel, there are charged the mercapto group-containing cellulose derivative solution (162 parts), styrene (24.8 parts), methyl methacrylate (16.6 parts), 2-hydroxyethyl methacrylate (4,6 parts), acrylonitrile (4 parts), butyl acetate (192.5 parts) and di-t-butyl peroxide (1.5 parts), and stirring is continued at 125°C for 6 hours while introducing nitrogen gas therein whereby a uniform, transparent resin solution containing 25.7 % of involatile components and possessing a viscosity of M to N and a color number of 1 is obtained. From this resin solution, no mercapto group is detected. When the resin solution is spread out on a glass plate and the solvent is volatilized, there is obtained a transparent film.

The resin solution (116 parts) is admixed with a 10 % solution of dehydrated castor oil fatty acid modified acrylic resin (involatile components, 50 %; solvent, xylene) (140 parts) and titanium white (trade name "Tipake R-820" manufactured by Ishihara Sangyo Co., Ltd.) (59 parts) to make a white enamel. The enamel is sprayed on a plate previously subjected to phosphate treatment and dried at room temperature for 5 days so as to make a coating film of 40 to 50 $\mu$ in thickness. The physical properties of the film are shown in Table 1.

EXAMPLE 2

The mercapto group-containing cellulose derivative solution obtained as in Example 1 (31.4 parts) is admixed with styrene (25 parts), methyl methacrylate (44 parts), n-butyl acrylate (10 parts), 2-hydroxyethyl methacrylate (5 parts), laurylmercaptan (1 part), di-t-butyl peroxide (1.5 parts), butyl acetate (27 parts) and xylene (50 parts), and the mixture is treated as in Example 1 to give a uniform, transparent resin solution containing 49.5 % of involatile components and possessing a viscosity of $Z_1$ to $Z_2$, an acid value of 5.1 and a color number of 1. From the resin solution, no mercapto group is detected. Using the resin solution, there can be obtained a transparent film.

The resin solution (100 parts) is admixed with titanium white (trade name Tipake R-820) (25 parts) to make a white enamel, from which a coating film is formed in the same manner as in Example 1. The physical properties of the film are shown in Table 1.

EXAMPLE 3

In a reaction vessel, there are changed cellulose acetate butyrate (trade name "Tenth Second Butyrate" manufactured by EAstman Chemical Products Inc.; viscosity, 0.1 second) (Eastman parts), thioglycollic acid (10 parts) and acetyl ethylene glycol monoethyl ether (43 parts), and the reaction is carried out as in Example 1. After completion of the reaction, the mixture is admixed with butyl acetate (75 parts) to give a solution of the cellulose derivative containing mercapto groups in an amount of $6.4 \times 10^{-4}$ g.equivalent/g. The mercapto group-containing cellulose derivative solution contains 29.5 % of involatile components and possesses a viscosity of $Z_3$, an acid value of 11 and a color number of less than 1.

The mercapto group-containing cellulose derivative solution (48 parts) is treated with styrene (20 parts), methyl methacrylate (49 parts), n-butyl acrylate (5 parts), 2-hydroxyethyl methacrylate (7 parts), acrylonitrile (4 parts), di-t-butyl peroxide (1.5 parts), butyl acetate (24.2 parts) and toluene (45 parts) as in Example 1 to give a uniform transparent resin solution containing 50.3 % of involatile components and possessing a viscosity of $Z_3$, an acid value of 8.8 and a color number of 2. From the resin solution, no mercapto group is detected. Using the resin solution, there can be obtained a transparent film.

The resin solution (100 parts) is admixed with titanium white (trade name Tipake R-820) (25 parts) to make a white enamel, from which a coating film is formed. The physical properties of the film are shown in Table 1.

EXAMPLE 4

In a reaction vessel, cellulose acetate butyrate (114 parts) as in Example 1, 2-$\beta$-mercaptopropionic acid (14.2 parts) and acetyl ethylene glycol monoethyl ether (85 parts) are charged, and the reaction is carried out as in Example 1. After completion of the reaction, the mixture is admixed with butyl acetate (150 parts) to give a solution of the cellulose derivative containing mercapto groups in an amount of $3.0 \times 10^{-4}$ g.equivalent/g. The mercapto group-containing cellulose derivative solution contains 32.1 % of involatile components and possesses a viscosity of $Z_7$ and a color number of 2.

In a reaction vessel, there are charged the mercapto group-containing cellulose derivative solution (46.7 parts), styrene (30 parts), methyl methacrylate (43 parts), 2-hydroxyethyl methacrylate (12 parts), methacrylic acid (1 part), benzoyl peroxide (2 parts), butyl acetate (20 parts) and xylene (50 parts), and stirring is continued at 100°C for 20 hours while introducing nitrogen gas therein whereby a uniform, transparent resin solution containing 50.9 % of involatile components and possessing a viscosity of $Z_3$ to $Z_4$ and a color number of 2 is obtained. From the resin solution, no mercapto group is detected. Using the resin solution, there can be obtained a transparent film.

The resin solution (100 parts) is admixed with titanium white (trade name Tipake R-820) (25 parts) to make a white enamel, from which a coating film is formed. The physical properties of the film are shown in Table 1.

EXAMPLE 5

In a reaction vessel, there are charged the mercapto group-containing cellulose derivative solution obtained as in Example 1 (97.6 parts), methyl methacrylate (40 parts), n-butyl acrylate (5 parts), 2-ethylhexyl methacrylate (10 parts), vinyltoluene (30 parts), 2-hydroxyethyl methacrylate (5 parts), acrylonitrile (4 parts), methacrylic acid (1 part), xylene (47.4 parts) and di-t-butyl peroxide (1.5 parts), and stirring is continued at 130°C for 5 hours while introducing nitrogen gas therein. The resulting mixture is then kept at 100°C, and a mixture of methyl methacrylate (47 parts), n-butyl acrylate (5 parts), 2-ethylhexyl methacrylate (10 parts), vinyltoluene (30 parts), 2-hydroxyethyl methacrylate (2 parts), methacrylic acid (1 part), butyl acetate (32.4 parts), xylene (52.6 parts), 2,2'-azoisobutyronitrile (1.0 part) and laurylmercaptan (0.5 part) is dropwise added thereto over 30 minutes. Stirring is continued at the same temperature for further 7 hours to give a uniform, transparent resin solution containing 51.0 % of involatile components and possessing a viscosity of $Z_5$ and a color number of 1. From the resin solution, no mercapto group is detected.

The resin solution (200 parts) is admixed with an alkyd resin solution (trade name "Beckosol ODE-230-70" manufactured by Dainippon Ink Industry Co., Ltd.; involatile components, 70 %) (36 parts), a solution of cellulose acetate butyrate (trade name "EAB-451-1") in a 2:8 mixture of methyl ethyl ketone and butyl acetate (involatile components, 20 %) (100 parts) and titanium white (trade name Tipake R-820) (72.5 parts) to make a white enamel, from which a coating film is formed.

The physical properties of the film are shown in Table 1. The film reveals an excellent repairing property, i.e. no cracking being produced at repairing. In the cyclocrack test, in which the test sample is repeatedly subjected to standing first at 60°C for 1.5 hours and then at −20°C for 1.5 hours, the film does not undergo any change even after the 20th cycle.

EXAMPLE 6

The mercapto group-containing cellulose derivative solution obtained as in Example 1 (48.8 parts) is treated with methyl methacrylate (37 parts), n-butyl acrylate (15 parts), styrene (20 parts), 2-hydroxyethyl methacrylate (12 parts), methacrylic acid (1 part), di-t-butyl peroxide (1.5 parts), butyl acetate (17 parts) and xylene (50 parts) as in Example 1 to give a uniform, transparent resin solution containing 49.8 % of involatile components and possessing a viscosity of $Z_2$, an acid value of 9.0 and a color number of 1. From the resin solution, no mercapto group is detected.

The resin solution (200 parts) is admixed with titanium white (trade name Tipake R-820) (50 parts) to make a white enamel, which is then admixed with polyisocyanate (trade name "Desmodur N-75" manufactured by Bayer Co., Ltd.; polyisocyanate content, 75 %) (20 parts). Using the resultant enamel, a coating film is formed. The physical properties of the film are shown in Table 1.

When the test sample is dipped in water at 40°C for 10 days, or in 0.1 N sodium hydroxide solution or 0.1 N sulfuric acid solution at room temperature for 24 hours, no change is observed on the film.

EXAMPLE 7

The resin solution obtained as in Example 6 (200 parts) is admixed with a melamine formaldehyde resin solution (trade name "Super Beckamine J-820" manufactured by Dainippon Ink Industry Co., Ltd.; involatile components, 50 %) (60 parts) and titanium white (trade name Tipake R-820) (100 parts) to make a white enamel. The enamel is sprayed on an iron plate previously subjected to phosphate treatment, and the plate is baked at 120°C for 20 minutes in a baking furnace to form a coating film. The physical properties of the film are shown in Table 1.

When the plate is dipped in water at 40°C for 10 days, or in 0.1 N sodium hydroxide solution or 0.1 N sulfuric acid solution at room temperature for 24 hours, no change is observed on the film.

EXAMPLE 8

In the same reaction vessel as in Example 1, there are charged cellulose acetate butyrate (trade name "EAB-531-1" manufactured by Eastman Chemical Products Inc.; viscosity, 1 second) (100 parts) and thioglycollic acid (20 parts), and stirring is continued at 145° to 150°C for 6 hours while introducing nitrogen gas therein. After completion of the reaction, the mixture is admixed with acetone (100 parts) and then portionwise poured into a large amount of water to precipitate the cellulose derivative for elimination of unreacted thioglycollic acid. The precipitate is collected and dried at 60°C under reduced pressure. The thus obtained cellulose derivative contains mercapto groups in an amount of $2.0 \times 10^{-3}$ g.equivalent/g.

The mercapto group-containing cellulose derivative (40 parts) is dissolved in a mixture of methyl methacrylate (68 parts), isobutyl methacrylate (24 parts), n-butyl acrylate (8 parts), styrene (36 parts), grycidyl methacrylate (24 parts), t-dodecylmercaptan (5 parts) and 2,2'-azobis-2,4-dimethylvaleronitrile (6 parts), and the resultant solution is charged in a reaction vessel equipped with a stirrer, a thermometer, a cooler and a gas inlet wherein a 0.25 % aqueous solution of hydroxypropylmethylcellulose (600 parts) has been previously charged. Stirring is continued in nitrogen stream to disperse the above solution into the water layer. The temperature is raised up to 70°C in 10 minutes, and stirring is continued at the same temperature for 5 hours. After completion of the reaction, the pearly resin is taken out from the reaction mixture, washed with water and dried. From this resin, no mercapto group is detected. The melting point of the resin is 110° to 120°C, and the average molecular weight of the polymer component originated from the polymerizable monomers is 8,300.

The resin (100 parts) is admixed with titanium white (trade name Tipake R-820) (24 parts) and adipic acid (6parts), and the mixture is melt blended at 120°C by the aid of an extruder. The product is crushed into powders, which are then screened through a sieve of 150 mesh. The resultant powders are applied on an iron plate by the aid of an electrostatical coating machine so as to make a coating film of 100 μ in thickness. The plate is baked at 200°C for 20 minutes in a baking furnace. The physical properties of the film are shown in Table 1.

Table 1

| Physical property | Example 1 | 2 | 3 | 4 | 5 | 6 | 7 | 8 | Reference A | Reference B |
|---|---|---|---|---|---|---|---|---|---|---|
| Appearance | II | I | I | I | I | I | I | I | V | III |
| Workability on coating | II | II | II | II | I | I | I | I | IV | I |
| Gloss (at 60°) | 92 | 93 | 93 | 93 | 93 | 94 | 94 | 91 | 79 | 85 |
| Drying | II | II | I | II | I | I | I | I | II | I |
| Pencil hardness | HB | F | F | F | F | 2H | 3H | 2H | F | F |
| Resistance to gasoline (20°C, 30 min.) | II | II | I | II | II | I | I | I | II | I |
| Resistance to ultraviolet ray (Yellowing rate) (15 W, 30 cm, 24 hrs.) | II | II | II | II | II | I | I | I | II | III |

Note:
The numerals I to V indicate respectively the following evaluations: I — very good; II — good; III — ordinary; IV — bad; V — very bad.

When the plate is dipped in water at 40°C for 10 days, or in 0.1 N sodium hydroxide solution or 0.1 N sulfuric acid solution at room temperature for 24 hours, no change is observed on the film.

The procedures as in Examples 1 to 6 are repeated but using the corresponding cellulose derivatives not containing mercapto groups in place of the cellulose derivatives containing mercapto groups. The obtained films are all turbid.

Reference Example A A

A resin solution is prepared as in Example 3 but not using thioglycollic acid. From the obtained solution, a film is formed. The physical properties of the film are shown in Table 1.

Reference Example B

A commercially available paint composition containing an acrylic resin, coconut oil modified alkyd resin and nitrocellulose (viscosity, one-fourth second) in a weight ratio of 5:5:2 is sprayed on a plate previously subjected to phosphate treatment and dried at room temperature for 5 days to make a coating film of 40 to 50 $\mu$ in thickness. The physical properties of the film are shown in Table 1.

What is claimed is:

1. A resin prepared by reacting a mercapto group-containing cellulose derivative with one or more polymerizable monomers selected from the group consisting of esters of acrylic acid and methacrylic acid with alkanols having an alkyl group of 1 – 15 carbon atoms, styrene, vinyltoluene, p - t - butylstyrene, $\alpha$ - methylstyrene, 2 - hydroxyethyl acrylate, 2-hydroxypropyl acrylate, 2 - hydroxyethyl methacrylate, 2 - hydroxylpropyl methacrylate, propylene glycol monomethacrylate, 1-methyl-2-hydroxyethyl acrylate, 1-methyl-2-hydroxyethyl methacrylate, glycerol monomethacrylate, glycidyl acrylate, glycidyl methacrylate, acrylonitrile, methacrylonitrile acrylic acid, methacrylic acid, crotonic acid, itaconic acid, fumaric acid and maleic acid in a weight ratio of the mercapto group — containing cellulose derivative to the polymerizable monomer of from 3:97 to 60:40, said mercapto group — containing cellulose derivative being obtained by the reaction between a cellulose derivative selected from the group consisting of nitrocellulose, cellulose acetate, cellulose acetate propionate, cellulose acetate butyrate, methylcellulose, ethylcellulose, benzylcellulose, hydroxyalkylcellulose and carboxymethylcellulose and a mercaptocarboxylic acid selected from the group consisting of thioglycollic acid, mercaptopropionic acid, thiomalic acid and thiosalicylic acid, such that the mercapto group-containing cellulose derivative contains $5 \times 10^{-4}$ to $5 \times 10^{-3}$ g. equivalent of SH/gram.

2. The resin according to claim 1, wherein the cellulose derivative is cellulose acetate butyrate.

3. The resin according to claim 2, wherein the cellulose acetate butyrate is 0.1 to 6 seconds in viscosity.

4. The resin according to claim 1, wherein the reaction between a mercapto group-containing cellulose derivative and one or more polymerizable monomers is effected in the presence of a chain transfer agent.

5. The resin according to claim 1, wherein the reaction between a mercapto group-containing cellulose derivative and one or more polymerizable monomers is effected in the presence of a polymerizable initiator.

6. The resin according to claim 1, wherein the reaction between a mercapto group-containing cellulose derivative and one or more polymerizable monomers is effected in multi stages.

7. The resin according to claim 6, wherein the reaction at the initial stage is effected in the presence of a peroxide.

8. The resin according to claim 1, wherein the esters of acrylic acid and methacrylic acid with alkanols having an alkyl group of 1 to 15 carbon atoms are used in an amount of 30 to 100 % by weight on the basis of the total weight of the polymerizable monomer(s).

9. The resin according to claim 1, wherein the glycidyl acrylate and glycidyl methacrylate are used in an amount of 5 to 40 % by weight on the basis of the total weight of the polymerizable monomer(s).

10. The resin according to claim 1, wherein the acrylonitrile and methacrylonitrile are used in an amount of 10 % by weight or less on the basis of the total weight of the polymerizable monomer(s).

11. A coating composition which comprises as an essential component the resin as claimed in claim 1.

12. The coating composition according to claim 11, wherein at least one solvent is included.

13. The coating composition according to claim 11, which is a powder form melting at 50° to 200°C.

14. The resin according to claim 1, wherein the polymerizable monomers are selected from at least one ester of acrylic or methacrylic acid with alkanols having an alkyl group of 1 to 15 carbon atoms.

15. The resin according to claim 14, wherein the polymerizable monomer is methyl methacrylate.

16. The resin according to claim 14, wherein the polymerizable monomers further include at least one member selected from glycidyl acrylate and glycidyl methacrylate in an amount of 5 to 40% by weight on the basis of the total weight of the polymerizable monomers.

17. The resin according to claim 14, wherein the polymerizable monomers further include at least one member selected from acrylonitrile and methacrylonitrile in an amount of 10% by weight or less on the basis of the total weight of the polymerizable monomers.

18. The resin according to claim 1 wherein at least one member of the group selected from styrene, vinyltolune, p - t - butylstyrene and $\alpha$ - methylstyrene are used in an amount of 50% based on the weight of the polymerizable monomers.

19. The resin according to claim 1 wherein at least one member selected from the groups consisting of 2 - hydroxyethyl acrylate, 2 - hydroxypropyl acrylate, 1 - methyl - 2 - hydroxyethyl acrylate, 2 - hydroxyethyl methacrylate, 1 - methyl - -2 - hydroxyethyl methacrylate, propylene glycol monomethacrylate and glycerol monomethacrylate are used in an amount of 25% by weight or less on the basis of the total weight of the polymerizable monomers.

20. A resin according to claim 1 wherein at least one member of the group consisting of acrylic acid, methacrylic acid, crotonic acid, itaconic acid, fumaric acid and maleic acid are used in an amount of 5% by weight or less, on the basis of the total weight of the polymerizable monomers.

21. The resin according to claim 14 wherein the polymerizable monomers further include at least one member selected from the group consisting of styrene, $\alpha$ - methylstyrene, and vinyltoluene acid, p-t-butylstyrene an amount of 50% by weight or less on the basis of the total weight of the polymerizable monomers.

22. The resin according to claim 14 wherein the polymerizable monomers further include at least one member selected from the group consisting of 2 - hydroxyethyl acrylate, 2 - hydroxypropyl acrylate, 1 - methyl - 2 -hydroxyethyl methacrylate, polypropylene glycol monomethacrylate and glycerol monomethacrylate.

23. The resin according to claim 14 wherein the polymerizable monomers further include at least one member selected from the group consisting of acrylic acid, methacrylic acid, crotonic acid, itaconic acid, fumaric acid and maleic acid.

* * * * *